US012131712B2

(12) United States Patent
Calayir et al.

(10) Patent No.: US 12,131,712 B2
(45) Date of Patent: Oct. 29, 2024

(54) TILE PASSIVE MATRIX FOR DISPLAY BACKLIGHT SYSTEMS

(71) Applicant: Apple Inc., Cupertino, CA (US)

(72) Inventors: Vehbi Calayir, Santa Clara, CA (US); Youchul Jeong, Cupertino, CA (US); Joshua D. Goldman, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/980,252

(22) Filed: Nov. 3, 2022

(65) Prior Publication Data

US 2023/0186865 A1 Jun. 15, 2023

Related U.S. Application Data

(60) Provisional application No. 63/288,309, filed on Dec. 10, 2021.

(51) Int. Cl.
*G09G 3/34* (2006.01)

(52) U.S. Cl.
CPC ... *G09G 3/3426* (2013.01); *G09G 2320/0626* (2013.01); *G09G 2360/145* (2013.01)

(58) Field of Classification Search
CPC ............................ G09G 3/32; G09G 2300/026
See application file for complete search history.

(56) References Cited

U.S. PATENT DOCUMENTS

| | | | | |
|---|---|---|---|---|
| 10,665,181 | B2 | 5/2020 | Albrecht et al. | |
| 11,081,070 | B2 | 8/2021 | Calayir et al. | |
| 2007/0284994 | A1* | 12/2007 | Morimoto | H01L 25/0753 313/483 |
| 2008/0245949 | A1* | 10/2008 | Morimoto | G01J 1/32 250/205 |
| 2013/0016306 | A1* | 1/2013 | Ohno | G09G 3/3426 315/297 |
| 2013/0147782 | A1* | 6/2013 | Hsu | G09G 3/20 345/212 |
| 2017/0047393 | A1* | 2/2017 | Bower | H01L 33/62 |
| 2017/0316758 | A1 | 11/2017 | Atkins | |
| 2020/0319512 | A1* | 10/2020 | Murzyn | B60K 35/00 |
| 2021/0097943 | A1 | 4/2021 | Wyatt | |
| 2021/0116749 | A1* | 4/2021 | Kao | G02F 1/133602 |

* cited by examiner

*Primary Examiner* — Nan-Ying Yang
(74) *Attorney, Agent, or Firm* — Fletcher Yoder, P.C.

(57) ABSTRACT

Large sized electronic displays may include a backlight that generates light to illuminate a display panel. The backlight is divided into tiles that each includes a set of backlight elements that are driven by respective tile driver circuitry. Based on receiving brightness data and/or control signals from a backlight controller (BCON) of the backlight, the respective tile driver circuitry drives corresponding backlight elements such that the backlight elements suitably illuminate the display panel.

18 Claims, 11 Drawing Sheets

TILE PASSIVE MATRIX FOR DISPLAY BACKLIGHT SYSTEMS

CROSS-REFERENCE TO RELATED APPLICATIONS

This application claims priority to U.S. Provisional Application No. 63/288,309, filed Dec. 10, 2021, entitled "Tile Passive Matrix for Display Backlight Systems," the disclosure of which is incorporated by reference in its entirety for all purposes.

SUMMARY

The present disclosure relates generally to electronic devices with display panels, and more particularly, to the architecture of backlight systems associated with the display panels.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Numerous electronic systems—such as computers, mobile phones, portable media devices, tablets, televisions, virtual-reality headsets, and vehicle dashboards, among many others often include or use electronic displays. Some electronic displays may include a display panel, such as a liquid crystal display (LCD) panel, and a corresponding backlight (e.g., a 0-dimensional backlight, 1-dimensional backlight, a 2-dimensional backlight). Display panels on electronic displays may display images that present visual representations of information. In any case, a display panel may generally display an image by actively controlling light emission from its display pixels based on receiving light from the corresponding backlight. By adjusting the brightness of different color components of the display pixels of the display panel, a variety of different colors may be generated that collectively produce a corresponding image.

The backlight may include backlight elements that generate light that exits the backlight towards the display panel. The backlight may illuminate the display panel based on brightness data corresponding to backlight elements of the backlight. The backlight may include driver circuitry (e.g., row driver, column drivers, and/or backlight controller (BCON)) that controls the backlight elements. In response to receiving light from the backlight, the display panel may selectively allow some or all of the light from the backlight to pass through the display pixels, and thereby generating display light visible to a user of the electronic display. The backlight elements, such as light-emitting diodes (LEDs), may be arranged in rows and columns. The light-emitting diodes (LEDs) may be controlled to illuminate a portion of the display pixels in the display panel.

Separate driver circuitry may control each backlight element or a collection of backlight elements. However, driving individual backlight elements of a large-sized display (e.g., electronic displays with a size greater than or equal to 24 inches or displays that are smaller but have an especially high resolution) via separate driver circuitry may not be cost effective nor resource effective. Instead, the backlight may divided into regions or tiles, where each tile includes respective backlight elements driven by driver circuitry. Rather than separate row and column drivers controlling each backlight element, the same row and column driver may drive backlight elements of respective tiles of the backlight based on time signals from a backlight timing controller (e.g., backlight controller (BCON)). That is, backlight elements within a tile may be controlled by a respective row and column driver. Dividing the backlight into a tiled matrix and reducing the number of driver circuits (e.g., row and column drivers) may improve routing between backlight elements, provide signal and power integrity (SIPI) benefits, and reduce the cost of manufacturing electronic displays (e.g., large-sized or high-resolution displays).

Accordingly, the present disclosure provides techniques for illuminating large sized displays based on tile-based backlights. A tile-based backlight may include any suitable number of tiles, where each tile includes any suitable number of backlight elements and is driven by respective tile driver circuitry. Components (e.g., tile driver circuitry, off-board connector) of the backlight may be arranged in various configurations to reduce ground loop and improve signal and power integrity (SIPI). In some embodiments, the tile driver circuitry may be disposed along a spine of the backlight. In other embodiments, the tile driver circuitry may be disposed centrally on a respective tile. Further, the backlight may include a printed circuit board, where the backlight elements are disposed on the printed circuit board and the driver circuitry of the respective tiles is disposed on an interposer board. The interposer board may be smaller in size compared to the printed circuit board, and may be disposed on top or bottom of the printed circuit board. In other embodiments, the backlight may include the printed circuit board and an interposer board.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
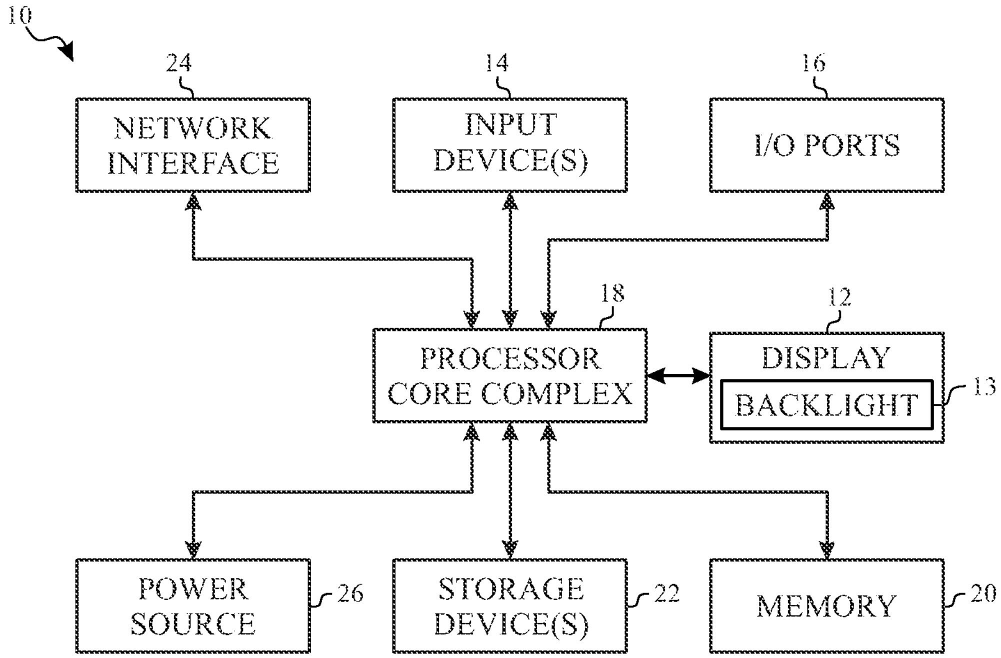
FIG. 1 is a block diagram of an electronic device with an electronic display, in accordance with an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display that has a display panel that is illuminated based on light generated from backlight elements of a backlight 13. The backlight 13 may include any number of backlight elements (e.g., light-emitting diodes (LEDs) and any suitable arrangement of the backlight elements. The backlight 13 may include driver circuitry such as row drivers, column drivers, and/or backlight controller (BCON) to drive the backlight elements. As described below, the backlight may be arranged based on tiled regions (e.g., tiles), and backlight elements of each tile may be driven by respective driver circuitry (e.g., row and column drivers).

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12 or brightness data to control light output by the backlight 13. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
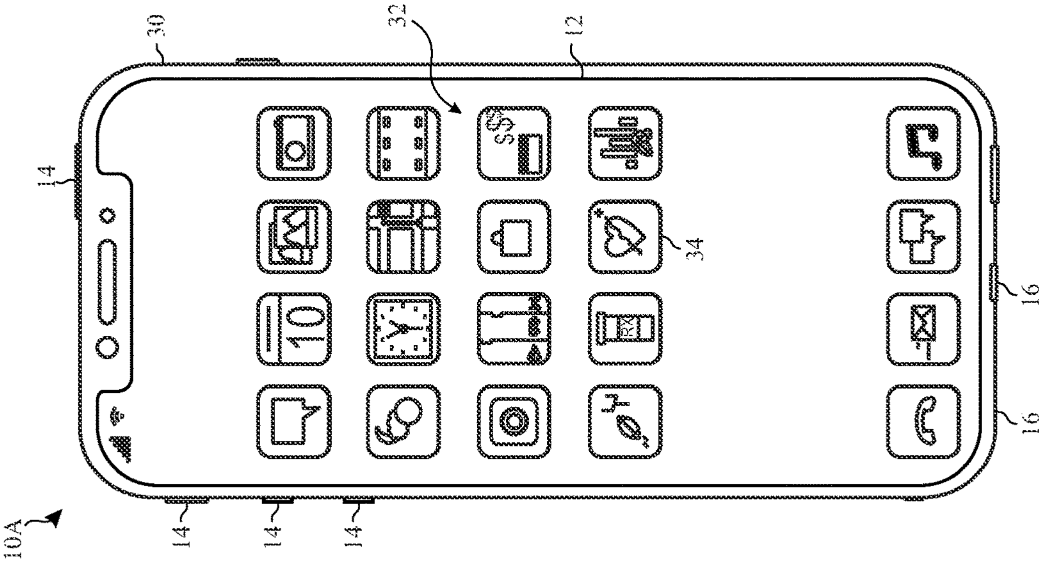
FIG. 2 is a front view of a handheld device representing another embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
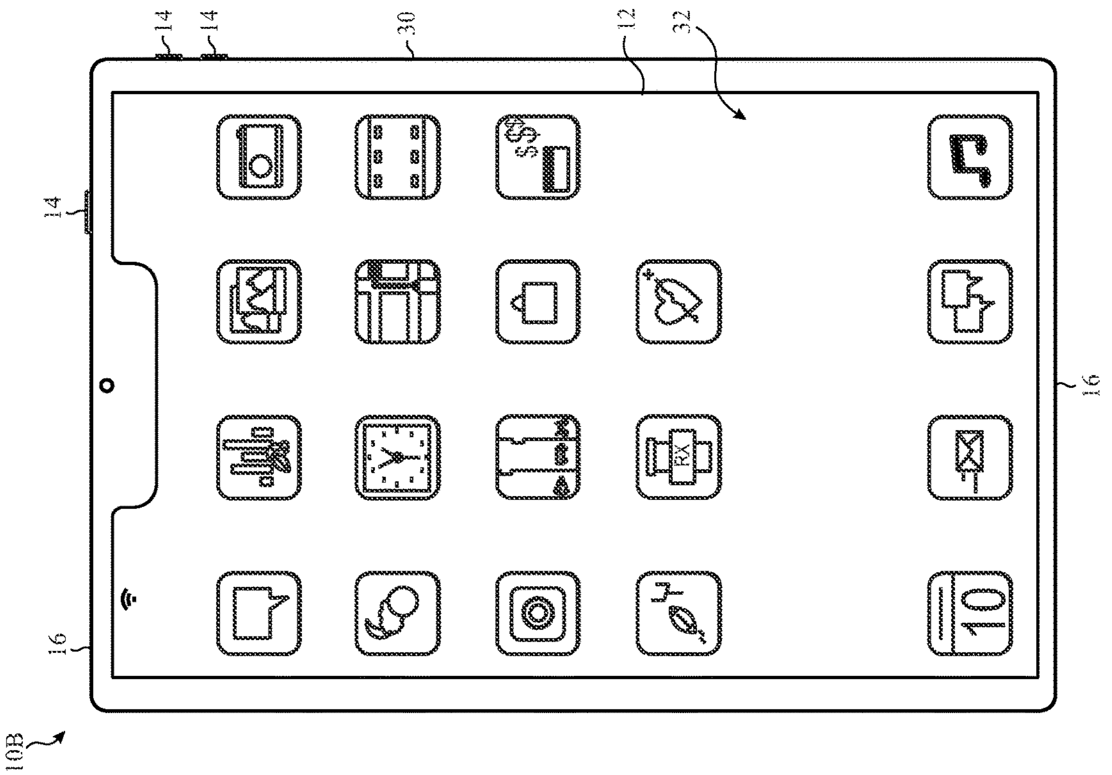
FIG. 3 is a front view of another handheld device representing another embodiment of the electronic device of FIG. 1.
Figure 4:
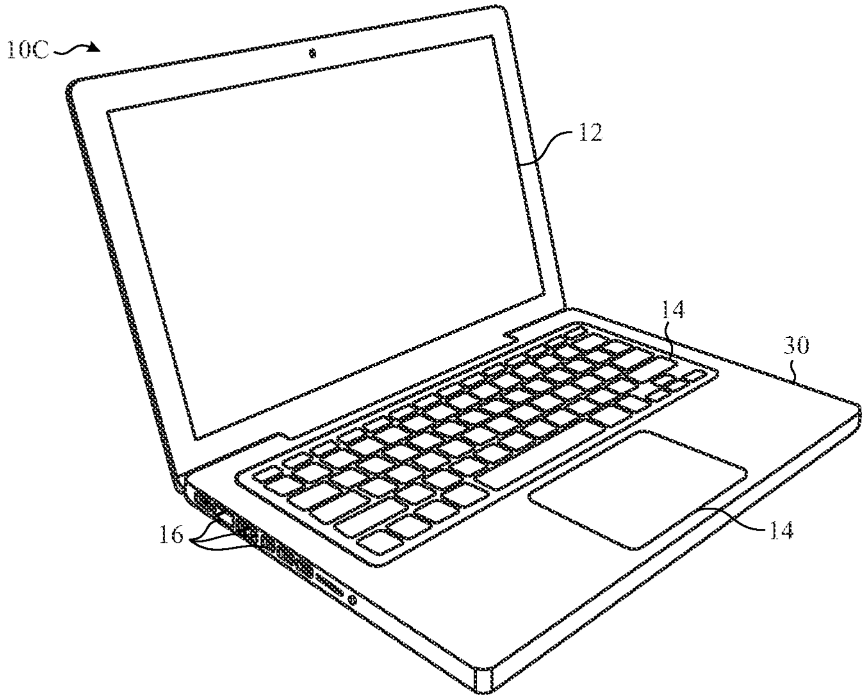
FIG. 4 is a perspective view of a notebook computer representing an embodiment of the electronic device of FIG. 1.
Figure 5:
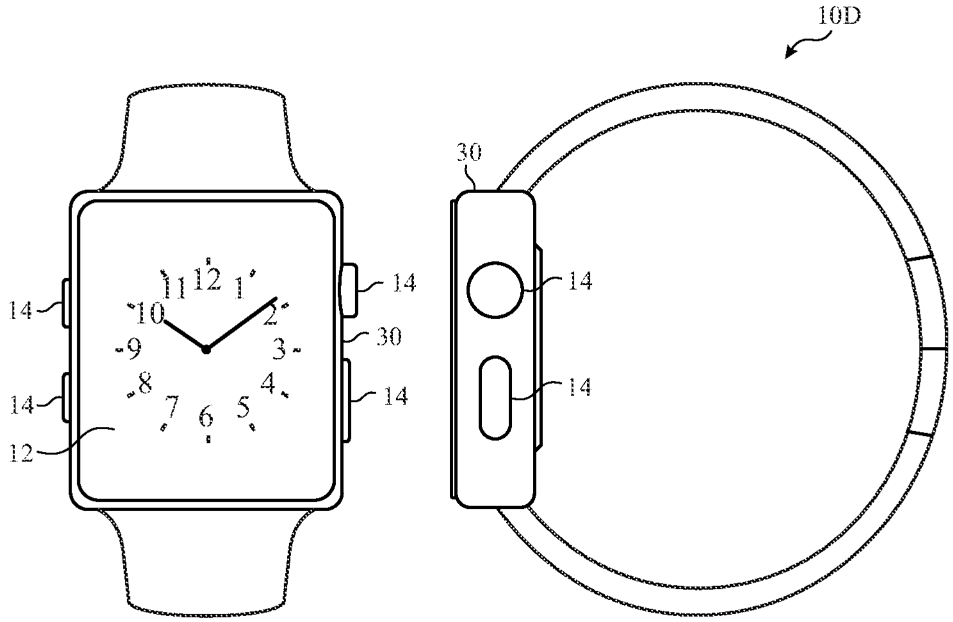
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
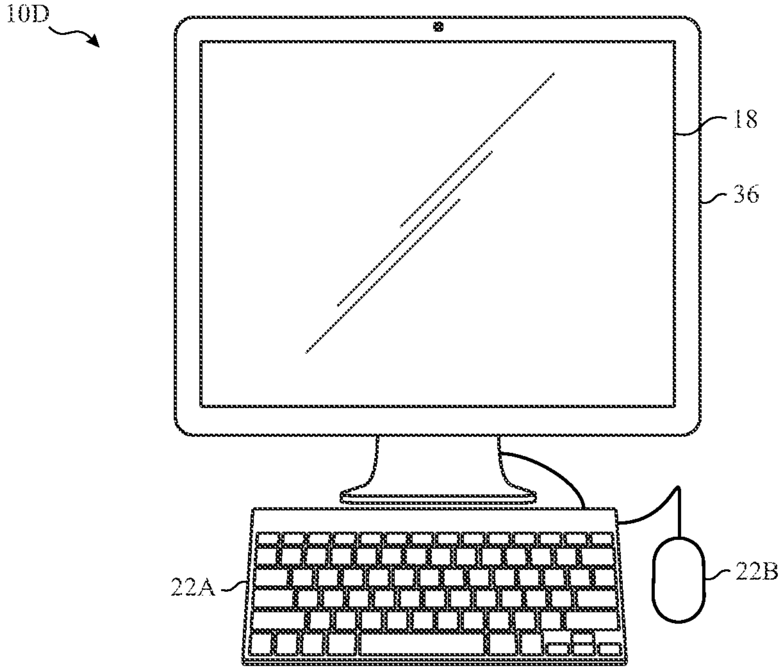
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
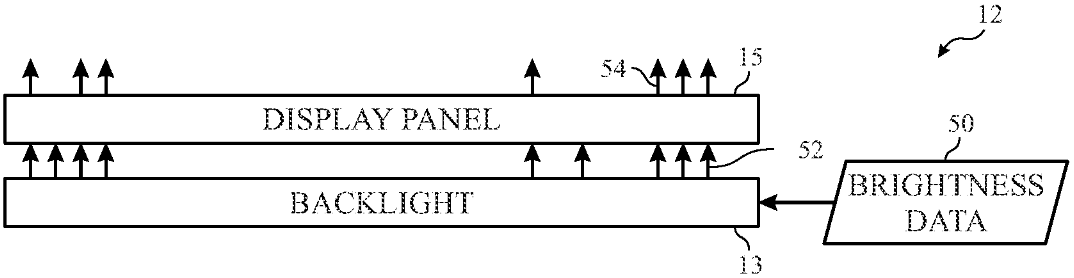
FIG. 7 is a block diagram of a side view of an electronic display of the electronic device of FIG. 1 having a display panel and a backlight, in accordance with an embodiment of the present disclosure.

With the foregoing in mind, FIG. 7 is a schematic block diagram of a side view of the electronic display 12 having the backlight 13 and a display panel 15. As mentioned above, the backlight 13 may include any suitable number of backlight elements (e.g., light-emitting diodes (LEDs) that are controlled by driver circuitry (e.g., row and column drivers, backlight controller (BCON)). In some embodiments, the driver circuitry may include a backlight controller (BCON) that controls various row and column drivers based on time signals. A row and column driver may drive respective backlight elements. For example, every backlight element of a tiled region of the backlight 13 may be driven by a respective row and column driver. As used herein, a tiled region (also referred to in this disclosure as a tile) is an area of the backlight 13 that includes any suitable number of backlight elements. For example, there may be an M×N matrix of tiles including any suitable number M columns of tiles and any suitable number N rows of tiles. The backlight 13 may operate as a two-dimensional backlight.

The backlight 13, via row and column drivers associated with the backlight elements, may receive brightness data 50 from the backlight controller (BCON) or processing circuitry (e.g., image processing circuitry). The brightness data 50 may indicate display color (e.g., green light, blue light, red light) and target luminance (e.g., brightness level) of the backlight elements. For example, based on the brightness data 50 and/or control signals received from the backlight controller (BCON), the row and column drivers may drive various backlight elements such that the backlight elements provide a desired amount of light 52 for the display pixels of the display panel 15. This allows the backlight 13 to achieve a high dynamic range where dark areas of the image on the display panel 15 may receive much less light than bright areas of the image on the display 15, which may receive much more light. Further, the backlight controller (BCON) may be communicatively coupled to the row and column drivers.

The backlight 13 emits the light 52 in the direction of the display panel 15. As illustrated, in some embodiments, the display panel 15 may be disposed above the backlight 13. Based on the light 52, the display panel 15 may selectively allow some or all of the light 52 to pass through the display pixels of the display panel 15, where the display panel 15, via the display pixels, generates display light 54 that is visible to a user of the electronic display 12. The light 52 from the backlight 13 serves to illuminate the display panel 15 based on the brightness data 50.

Figure 8:
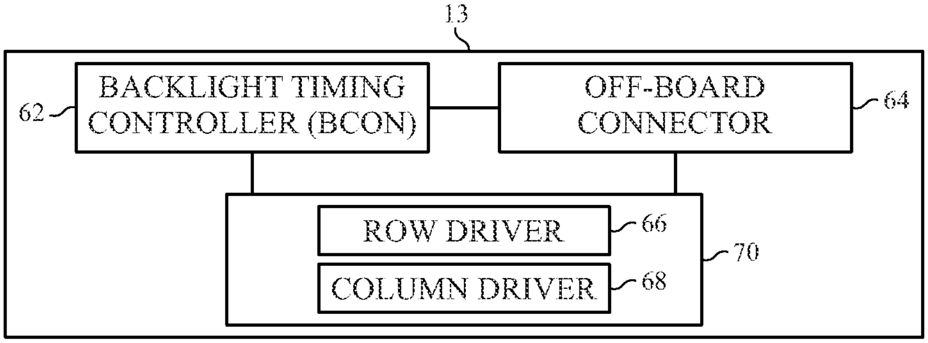
FIG. 8 is a block diagram of components within the backlight of FIG. 7, in accordance with an embodiment of the present disclosure.

FIG. 8 is a block diagram of non-limiting components within the backlight 13, such as a backlight controller (BCON) 62, an off-board connector 64, a row driver 66, and a column driver 68. As mentioned above, the backlight controller (BCON) 62 may be communicatively coupled to row and column driver circuitry 70 (e.g., the row driver 66 and the column driver 68). In some embodiments, the backlight controller (BCON) 62 may simultaneously control various row and column driver circuitry 70. In other embodiments, the backlight controller (BCON) 62 may drive various row and column driver circuitry 70 at different time intervals. The backlight controller (BCON) 62, the off-board connector 64, and the row and column driver circuitry 70 (e.g., the row driver 66 and the column driver 68) may each be communicatively coupled to each other. As used herein, the off-board connector 64 is a coupling that connects the backlight 13 to a component external to the backlight 13 (e.g., power supply). For example, processing circuitry of the electronic device 10 may supply the brightness data 50 and power to respective driver circuitry (e.g., tile driver circuitry) using the off-board connector 64 of the backlight 13. The backlight 13 may include any number of off-board connectors 64, and each off-board connector 64 may connect to a respective external component.

Figure 9:
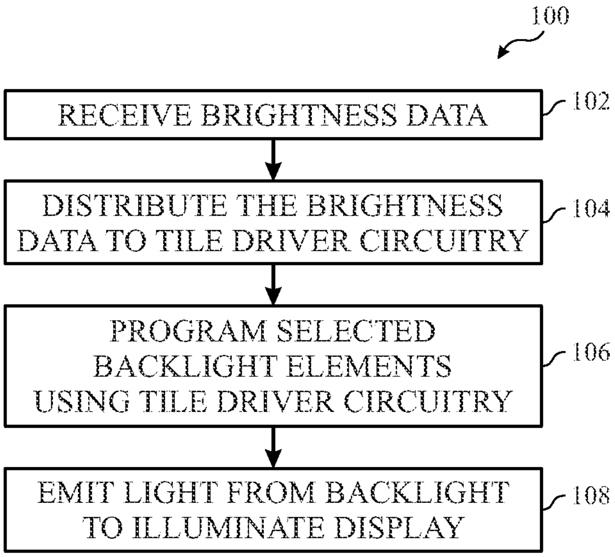
FIG. 9 is a flow diagram of a process for illuminating a display panel by controlling backlight elements of the backlight of FIG. 7, in accordance with an embodiment of the present disclosure.

With the preceding in mind, FIG. 9 is a flow diagram of a process 100 for illuminating the display panel 15 by controlling backlight elements of the backlight 13. While the process 100 is described using steps in a specific sequence, it should be understood that the present disclosure contemplates that the described steps may be performed in different sequences than the sequence illustrated, and certain described steps may be skipped or not performed altogether. At block 102, driver circuitry (e.g., backlight controller (BCON) 62) may receive the brightness data 50. For example, the backlight controller (BCON) 62 may receive the brightness data 50 from processing circuitry of the electronic device 10 via the off-board connector 64. As mentioned above, the brightness data 50 may indicate, for example, a display color (e.g., green light, blue light, red light) and target luminance (e.g., brightness level) of backlight elements of the backlight 13.

At block 104, the backlight controller (BCON) 62 distributes the brightness data 50 data to respective tile driver circuitry (e.g. the row driver 66 and the column driver 68). As mentioned above, the backlight 13 may be divided into tiles, where each tile includes a suitable number of backlight elements. Backlight elements of each tile may be controlled by a respective tile driver circuitry. For example, the same tile driver circuitry may drive each backlight element within a tile, but each tile may be associated with a different tile driver circuitry.

At block 106, the backlight controller (BCON) 62 may instruct the respective tile driver circuitry to program selected backlight elements based on the brightness data 50 and/or control signals. As mentioned above, each backlight element may be associated with a switch. And the tile driver circuitry may program selected backlight elements by turning on or off respective switches associated with the selected backlight elements based on the brightness data 50 and/or control signals received from the backlight controller (BCON) 62. In some embodiments, the tile driver circuitry may also adjust an amount of current going through selected backlight elements by adjusting amplitude and/or pulse width based on the brightness data 50 and/or control signals received from the backlight controller (BCON) 62.

At block 108, based on programming the selected backlight elements, the backlight controller (BCON) 62 may cause the backlight 13 to emit light 52 to illuminate the display panel 15 (e.g., display pixels).

Figure 10:
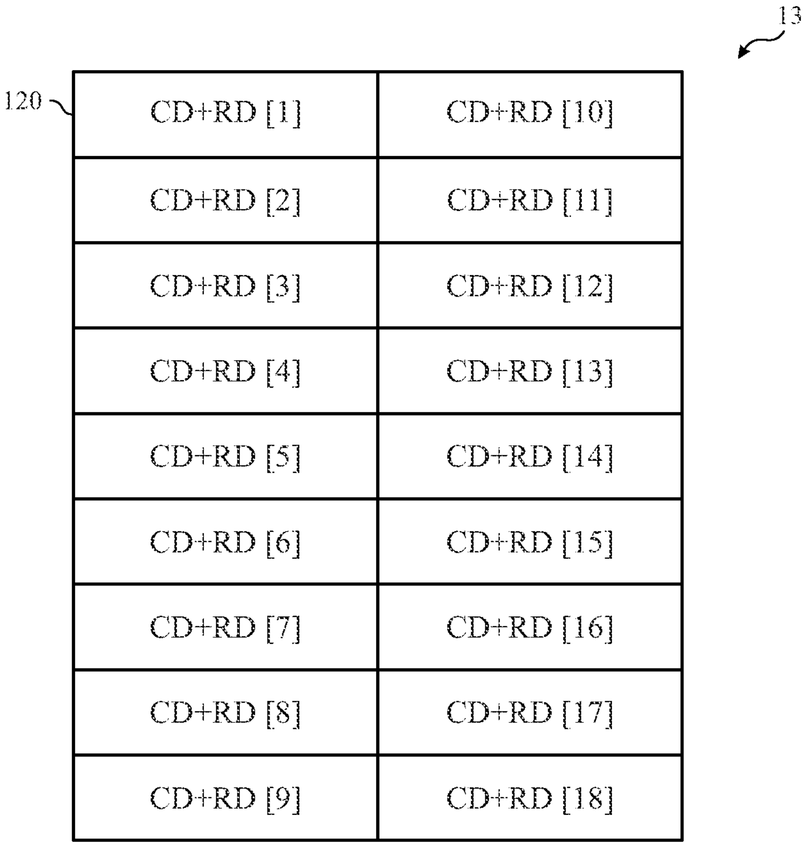
FIG. 10 is a schematic illustration of the backlight of FIG. 7 divided into tiles, where each tile is controlled by driver circuitry, in accordance with an embodiment of the present disclosure.

FIG. 10 is a schematic illustration of the backlight 13 divided into tiles 120, where each tile 120 is controlled by tile driver circuitry. As illustrated, the backlight 13 is divided into eighteen tiles 120, and each of the eighteen tiles 120 is driven by a respective tile driver circuitry (e.g., row driver 66, column driver 68, and/or row and column driver circuitry 70). Driving each tile 120 via a respective row and column driver circuitry 70 rather than driving each backlight element via a respective row and column driver circuitry 70 reduces the quantity of separate driver circuits within the backlight 13, thereby reducing the overall manufacturing cost of large-sized displays as well as the size of all of the circuitry used to drive the backlight elements.

Figure 11:
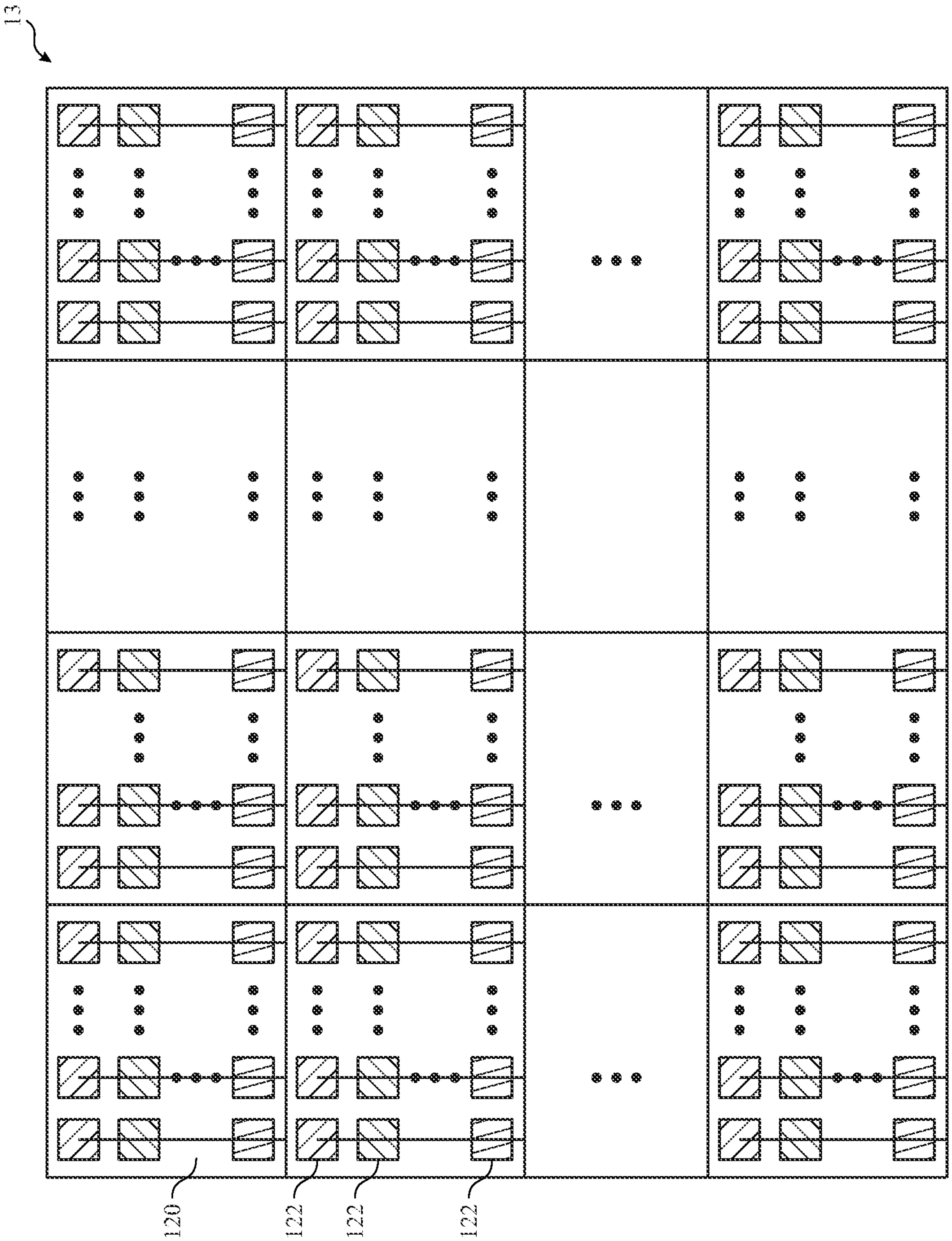
FIG. 11 is a schematic illustration of the backlight of FIG. 7 divided into tiles, where each tile includes a set of backlight elements, in accordance with an embodiment of the present disclosure.

FIG. 11 is a schematic illustration of the backlight 13 divided into tiles 120, where each tile 120 includes a set of backlight elements 122. Each tile 120 may include any suitable number of backlight elements 122 (e.g., 25, 50, 100 backlight elements). In some embodiments, the backlight 13 may include at least two rows and two columns of tiles 120.

Figure 12A:
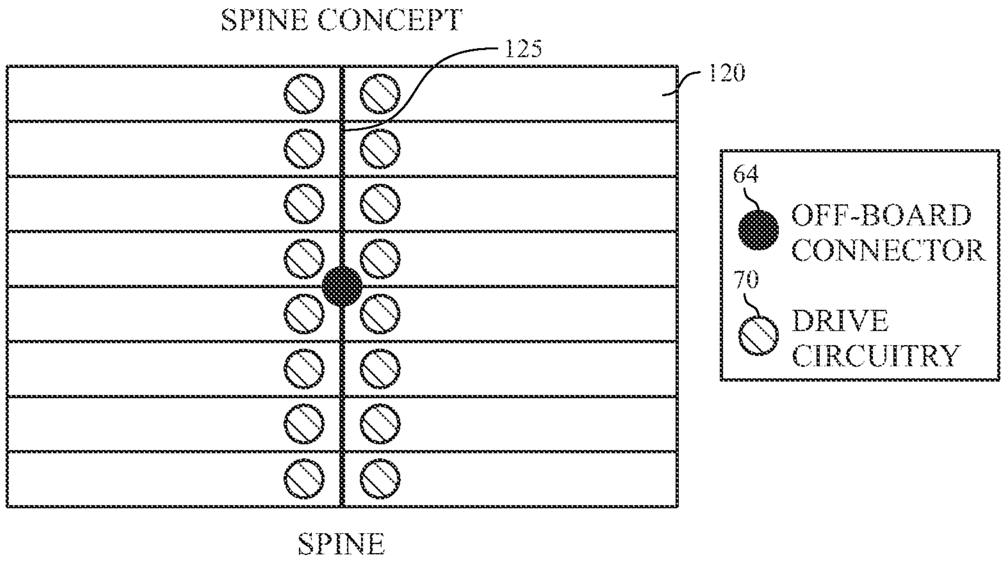
FIG. 12A is a schematic illustration of the backlight of FIG. 7 associated with spine routing, in accordance with an embodiment of the present disclosure.
Figure 12B:
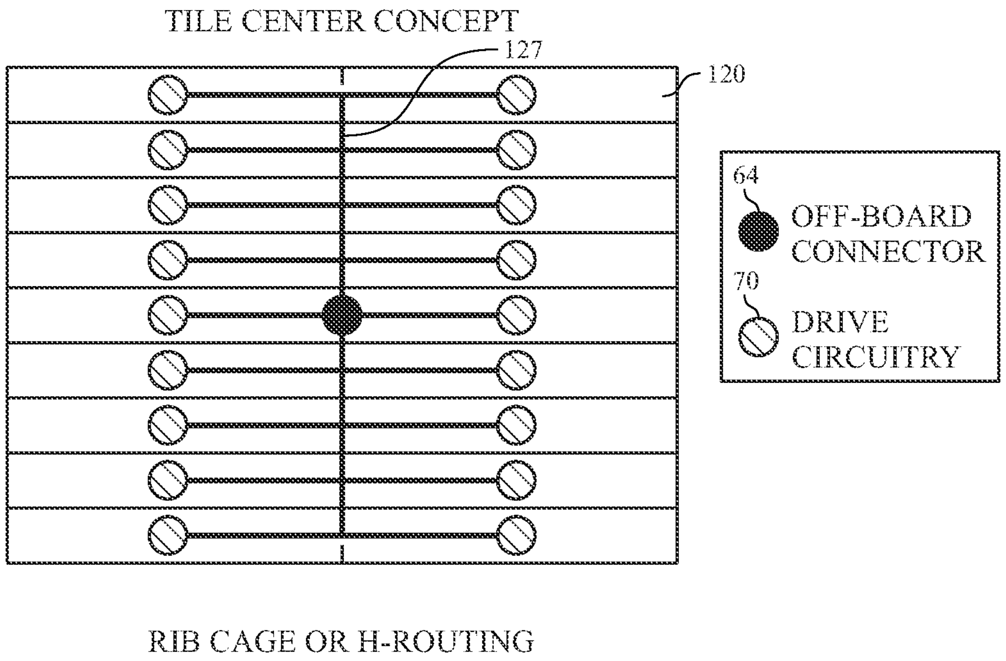
FIG. 12B is a schematic illustration of the backlight of FIG. 7 associated with rib-cage routing or H-routing, in accordance with an embodiment of the present disclosure.

The row and column driver circuitry 70 of a backlight may be arranged in various configurations (e.g., spine arrangement, tile center arrangement). The backlights in FIGS. 12A and 12B are both divided into tiles 120 but are different in arrangement with respect to row and column driver circuitry 70. FIG. 12A is a schematic illustration of the backlight 13 associated with spine routing 125. As illustrated, the respective row and column driver circuitry 70 associated with each tile 120 and the off-board connector 64 are disposed along a spine of the backlight 13. In contrast, FIG. 12B is a schematic illustration of the backlight 13 associated with rib-cage routing or H-routing 127 (e.g., tile center arrangement). With respect to rib-cage routing or H-routing 127, respective row and column driver circuitry 70 associated with each tile 120 disposed centrally (e.g., approximately equidistant from two edges of the tile 120, approximately equidistant from all edges of the tile 120, approximately equidistant from the outermost backlight elements of the tile 120) on each tile 120. The off-board connector 64 may be disposed along the spine of the backlight 13. As illustrated, the off-board connector 64 is disposed along the spine of the backlight at a central location of the backlight 13. In additional and/or alternative embodiments, the off-board connector 64 may be disposed on an edge of the tile 120 or centrally on the tile 120. In some embodiments, components of the backlight 13 may be arranged according to a combination of the spine routing 125 and the rib-cage routing or H-routing 127. That is, multiple columns of tiles 120 of the backlight 13 may be associated with the rib-cage routing or H-routing 127 from a central location of the backlight 13 to respective spines of two different columns of the backlight 13. For example, the backlight may include four columns of tiles 120 (e.g., column 1, column 2, column 3, and column 4). For example, the backlight 13 may include the rib-cage routing or H-routing 127 from a central location of the backlight 13 to a first spine between column 1 and column 2. Further, the backlight 13 may include the rib-cage routing or H-routing 127 from a central location of the backlight 13 to a second spine between column 3 and column 4. In this way, the backlight 13 may incorporate the spine routing 125 and the rib-cage routing or H-routing 127 to arrange components (e.g., row and column driver circuitry 70, off-board connector 64).

Figure 13:
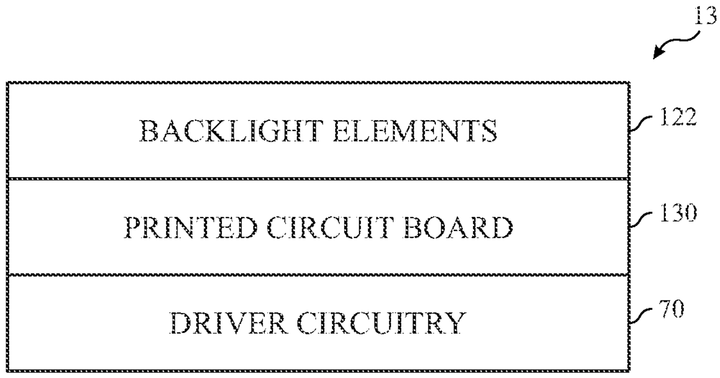
FIG. 13 is a block diagram of a side view of the backlight of FIG. 7, in accordance with an embodiment of the present disclosure.

FIG. 13 is a block diagram of a side view of the backlight 13. Non-limiting components of the backlight 13 include backlight elements 122, a multi-layered board (e.g., printed circuit 130), and driver circuitry 70 (e.g., backlight controller (BCON) 62, row driver 66, column driver 68). As illustrated, the backlight elements 122 may be disposed on a first side of the printed circuit board 130 while the driver circuitry may disposed on a second side of the printed circuit board 130. The printed circuit board 130 may include any suitable number of metal and dielectric layers and server to electrically connect the backlight elements 122 and the driver circuitry 70. In some embodiments, the driver circuitry 70 may be disposed on an interposer board that is coupled to the printed circuit board 130. As used herein, the interposer board is an electrical interface or substrate between the driver circuitry 70 and the printed circuit board 130.

Figure 14A:
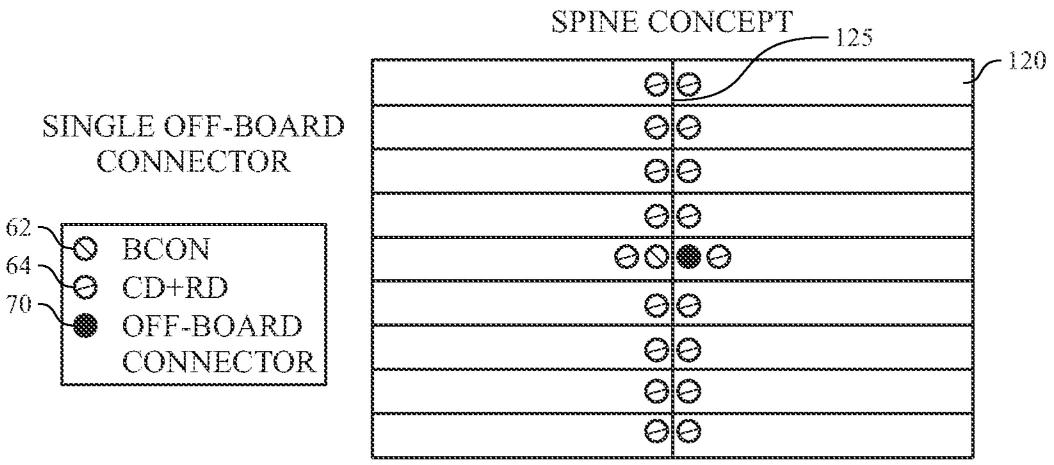
FIG. 14A is a schematic illustration of the backlight of FIG. 7 associated with spine routing and including a single off-board connector, in accordance with an embodiment of the present disclosure.
Figure 14B:
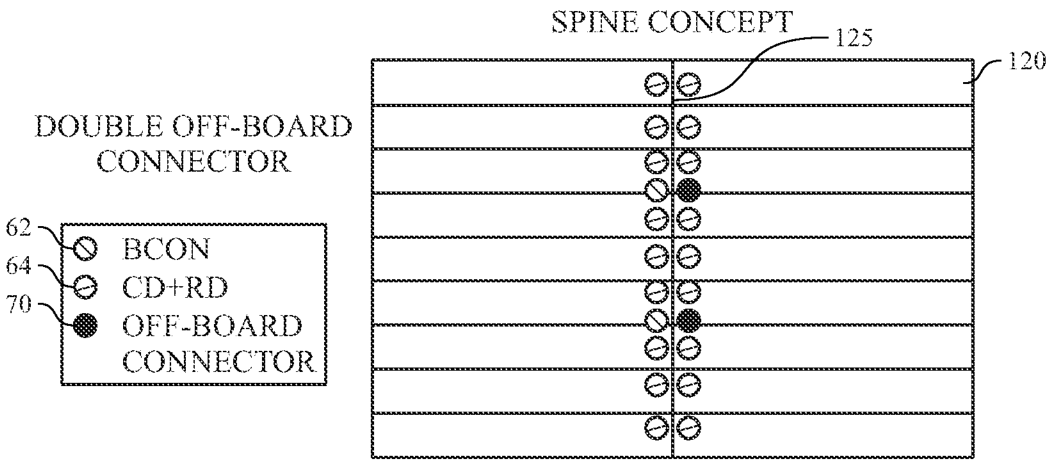
FIG. 14B is a schematic illustration of the backlight of FIG. 7 associated with spine routing and including multiple off-board connectors, in accordance with an embodiment of the present disclosure.

As mentioned above, each tile 120 of the backlight 13 is driven a respective row and column driver circuitry 70, and the backlight 13 may include any suitable number of backlight controller (BCON) 62 and off-board connectors 64. As such, FIGS. 14A-14B illustrate various arrangements of the respective row and column driver circuitry 70, the backlight controllers (BCON) 62, and the off-board connectors 64. As illustrated in FIG. 14A, the backlight 13 is associated with spine routing 125 and includes a single backlight controller (BCON) 62 and a single off-board connector 64. The respective row and column driver circuitry 70 associated with each tile 120, the backlight controller (BCON) 62, the off-board connector 64 are disposed along a spine of the backlight 13. Further, the backlight controller (BCON) 62 and the off-board connector 64 are disposed at a central location along the spine of the backlight 13. In some embodiments, the off-board connector 64 and the respective row and column driver circuitry 70 are disposed along two adjacent columns of tiles 120 of the set of tiles 120 of the backlight 13.

The backlight in FIG. 14B is also associated with spine routing but includes more than one off-board connector 64. As illustrated in FIG. 14B, the backlight 13 includes two backlight controllers (BCON) 62 and two off-board connectors 64. The respective row and column driver circuitry 70 associated with each tile 120, the two backlight controllers (BCON) 62, the two off-board connectors 64 are disposed along a spine of the backlight 13. As depicted, the two backlight controllers (BCON) 62 are disposed in separate tiles equidistant from each other. A first backlight controller (BCON) 62 may control a first set of tiles of the backlight 13, and a second backlight controller (BCON) 62 may control a second set of tiles the backlight 13. Similarly, the two off-board connectors 64 are also disposed in separate tiles equidistant from each other.

In the spine routing 125 arrangement of FIGS. 14A and 14B, the respective row and column driver circuitry 70 associated with each tile 120 is disposed closer to another respective row and column driver circuitry 70 associated with another tile 120 than a central location of that tile 120. In some embodiments, the backlight controller (BCON) 62 and the off-board connector 64 may be located in different tiles 120, as illustrated in FIGS. 14A and 14B. For example, the backlight controller (BCON) 62 may be located in a tile 120 that is adjacent to a tile 120 including the off-board connector 64. In other embodiments, the backlight controller (BCON) 62 and the off-board connector 64 may be located in the same tile 120.

Figure 14C:
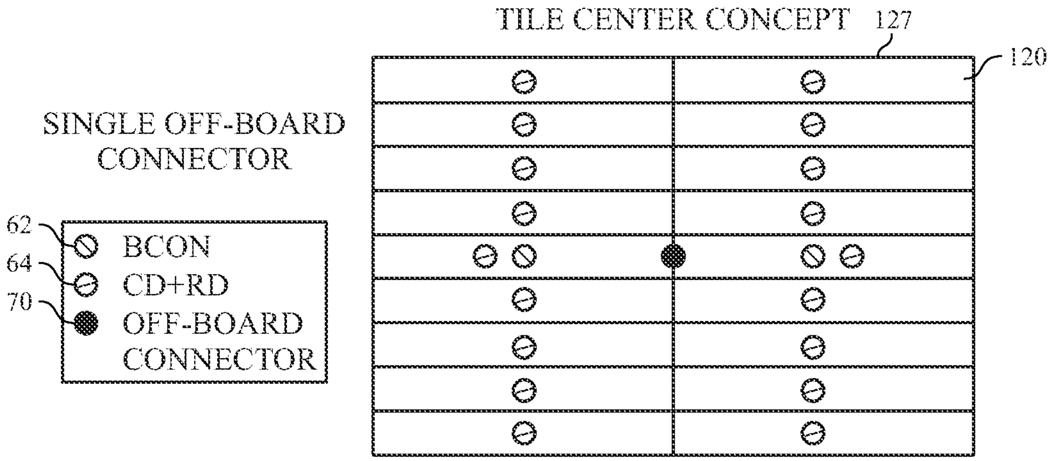
FIG. 14C is a schematic illustration of the backlight of FIG. 7 associated with rib-cage routing or H-routing and including a single off-board connector, in accordance with an embodiment of the present disclosure.

As illustrated in FIG. 14C, the backlight 13 is associated with rib-cage routing or H-routing 127 and includes a single off-board connector 64. The off-board connector 64 is disposed along the spine of the backlight 13 at a central location of the backlight 13. In tiles 120 that only include the respective row and column driver circuitry 70, respective row and column driver circuitry 70 may or may not be disposed centrally on that tile. In a tile 120 that includes both the respective row and column driver circuitry 70 and a backlight controller (BCON) 62, the backlight controller (BCON) 62 may be disposed centrally on that tile 120 while the respective row and column driver circuitry 70 is disposed adjacent to the backlight controller (BCON) 62 on that tile 120.

Figure 14D:
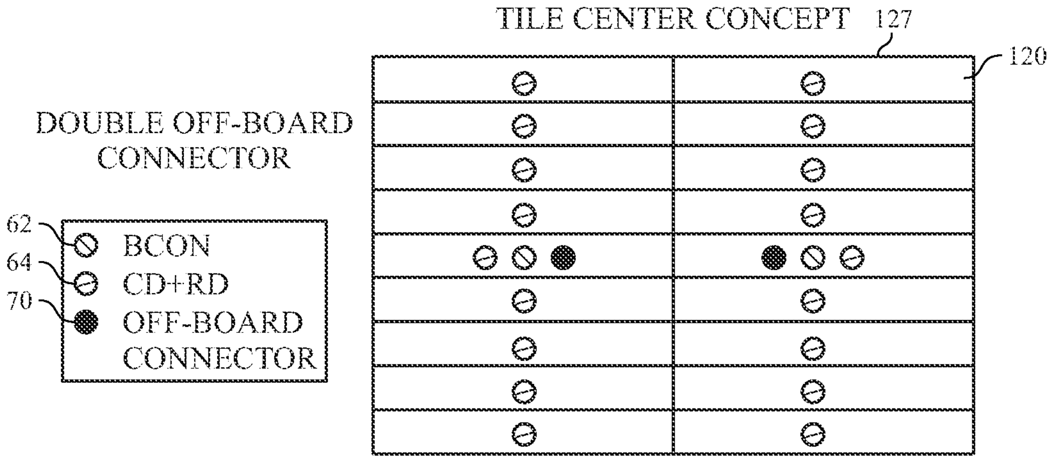
FIG. 14D is a schematic illustration of the backlight of FIG. 7 associated with rib-cage routing or H-routing and including multiple off-board connectors, in accordance with an embodiment of the present disclosure.

In an example shown in FIG. 14D, the backlight 13 is also associated with rib-cage routing or H-routing 127 but includes more than one off-board connectors 64. In tiles 120 that only include the respective row and column driver circuitry 70, respective row and column driver circuitry 70 is disposed centrally on that tile. In a tile 120 that includes the respective row and column driver circuitry 70, a backlight controller (BCON) 62, and the off-board connector 64, the backlight controller (BCON) 62 is disposed centrally on that tile 120 while the respective row and column driver circuitry 70 and the off-board connector 64 are disposed on adjacent sides of the backlight controller (BCON) 62 on that tile 120.

Figure 15:
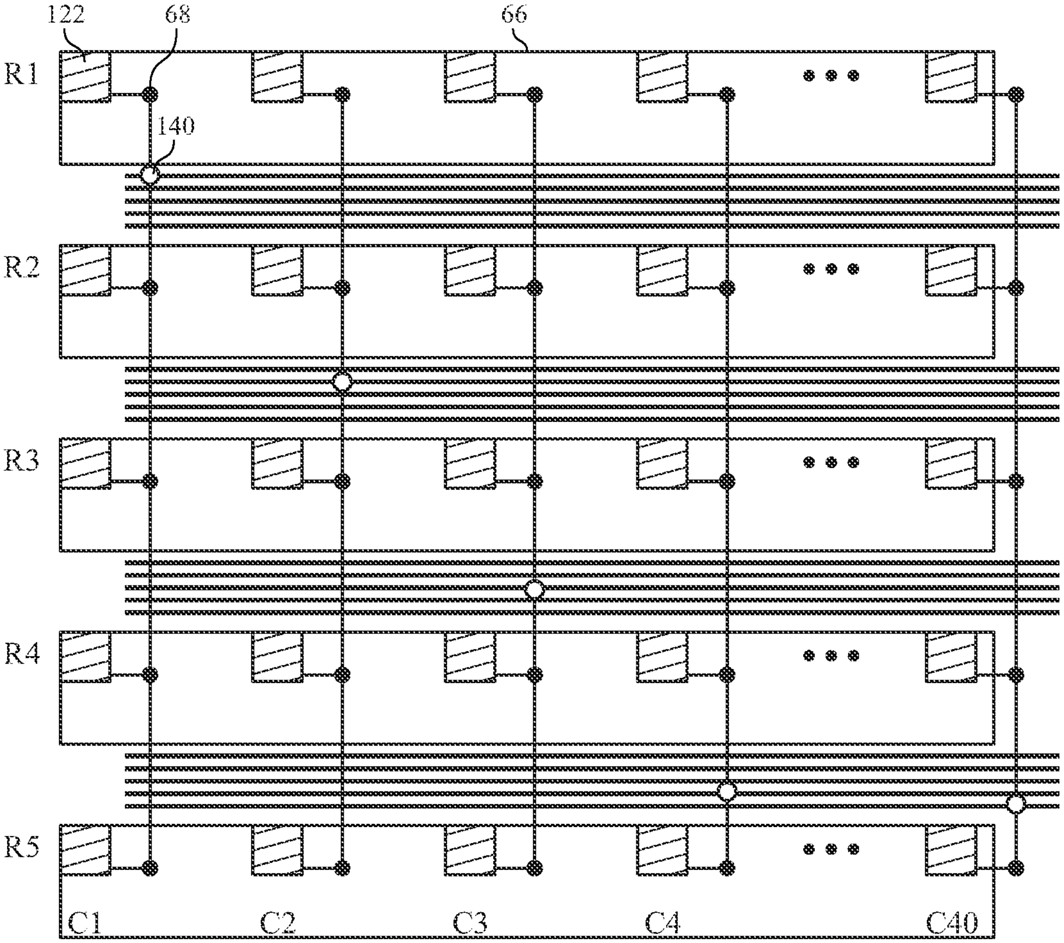
FIG. 15 is a schematic illustration of routing between tile-based row drivers and column drivers of the backlight of FIG. 7, in accordance with an embodiment of the present disclosure.

FIG. 15 is a schematic illustration of routing between the row drivers 66 and the column drivers 68 of the backlight 13, which includes 5 rows and 40 columns. As mentioned above, each tile may include a set of backlight elements 122, a row driver 66, and a column driver 68, where the row driver 66 and the column driver 68 drive the set of backlight elements. The row driver 66 may be coupled to multiple signal lines or traces (e.g., 3, 5, 7 signal lines), and the column driver 68 may also be coupled to multiple signal lines. For each tile of the backlight 13, the row driver 66 and the column driver 68 may be connected to each other via respective signal lines. In some embodiments, the connection 140 between the row driver 66 and the column driver 68 may include a via (e.g., top and bottom layered connection).

Figure 16A:
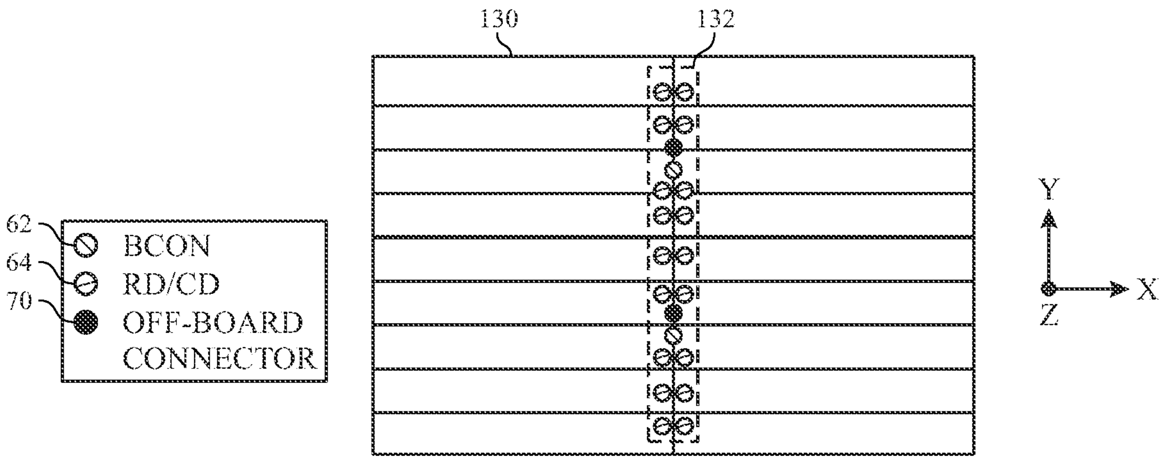
FIG. 16A is a schematic illustration of a top view of the backlight of FIG. 7 having a printed circuit board and an interposer board, in accordance with an embodiment of the present disclosure.

With the preceding in mind, FIG. 16A is a schematic illustration of a top view of the backlight 13 that includes the printed circuit board 130 and an interposer board 132. The printed circuit board 130 may include the backlight elements 122 while the interposer board 132 includes the driver circuitry 70 (e.g., backlight controller (BCON) 62 and the row and column driver circuitry 70) and the off-board connector 64. In some embodiments, a first portion of the interposer board 132 may include a greater number of the driver circuitry 70 and/or the off-board connectors 64 compared to a second portion of the interposer board 132. In other embodiments, two portion of the interposer board 132 may include an equal number of the driver circuitry 70 and/or the off-board connectors 64.

Figure 16B:
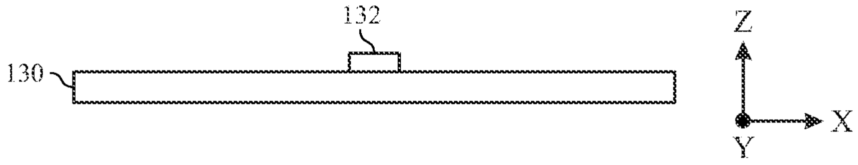
FIG. 16B is a schematic illustration of a side view of the backlight of FIG. 7 having a printed circuit board and an interposer board, in accordance with an embodiment of the present disclosure.

FIG. 16B is a schematic illustration of a side view of the backlight of FIG. 7 having the printed circuit board 130 and the interposer board 132. As illustrated in FIG. 16B, the interposer board 132 is disposed on top of the printed circuit board 130, and the interposer board 132 is smaller in area than the printed circuit board 130 by a threshold amount (e.g., the interposer board 132 is 10%, 20%, or 30% of the size of the printed circuit board 130).

Figure 17:
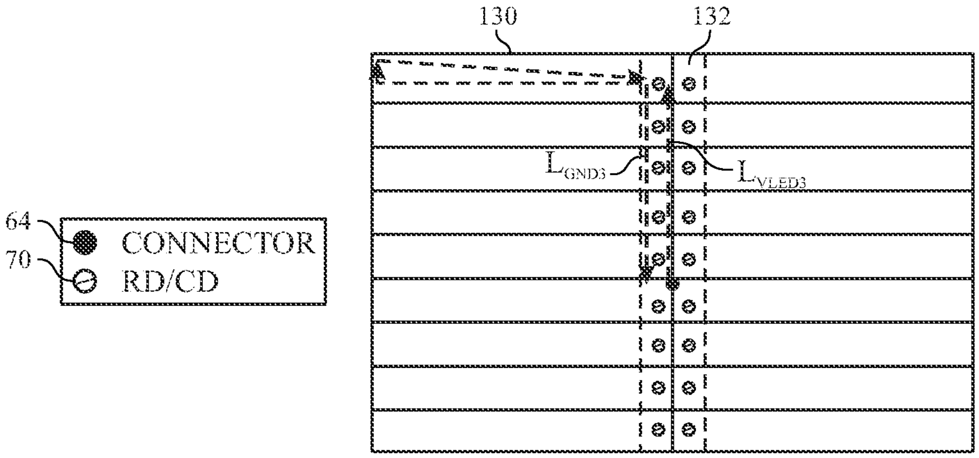
FIG. 17 is a schematic illustration of a top view of the backlight of FIG. 7 associated with spine routing and reduced ground loop inductance, in accordance with an embodiment of the present disclosure.

FIG. 17 is a schematic illustration of a top view of the backlight 13 associated with spine routing 125, in which the off-board connector 64 and the row and column driver circuitry 70 are disposed along. This spine-based arrangement of the backlight 13 helps reduce the area of ground loop within the backlight. Reducing the ground loop reduces noise interference between components (e.g., board connector 64, row and column driver circuitry 70) of the backlight 13, and thereby improves signal and power integrity (SIPI).

It can be appreciated that the backlight of large sized displays may be divided into tiles such that each tile is driven by a respective driver circuitry. By driving a set of backlight elements within a tile via a respective driver circuitry, reduces the total number of driver circuitry within the backlight, and thereby reduces the manufacturing cost of the backlight and the electronic display. Further, components of the backlight such as the respective driver circuitry, backlight controller (BCON), and the off-board connector may be arranged in any suitable configuration (e.g., spine routing, rib-cage routing). Configurations that include spine routing and rib-cage routing may improve routing between backlight elements and provide signal and power integrity (SIPI) benefits.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

a processor configured to provide brightness data corresponding to a plurality of backlight elements of a two-dimensional backlight;

a display panel; and the two-dimensional backlight, wherein the two-dimensional backlight is divided into at least two columns of tiles and at least two rows of tiles, wherein each tile of the at least two columns of tiles and the at least two rows of tiles respectively include a subset of the plurality of backlight elements and respective driver circuitry configured to drive the plurality of backlight elements to illuminate the display panel using the brightness data, wherein the respective driver circuitry comprises respective row driver circuitry and respective column driver circuitry, wherein the respective driver circuitry is configured to drive the plurality of backlight elements via the respective row driver circuitry at a first time interval and the respective column driver circuitry at a second time interval, and wherein the first time interval and the second time interval are different.

2. The electronic device of claim 1, wherein the two-dimensional backlight comprises a printed circuit board, wherein the plurality of backlight elements is disposed on a first side of the printed circuit board, and wherein the respective driver circuitry is disposed on a second side of the printed circuit board.

3. The electronic device of claim 1, wherein the two-dimensional backlight comprises a printed circuit board and an interposer board, wherein the plurality of backlight elements is disposed on the printed circuit board, and wherein the respective driver circuitry is disposed on the interposer board.

4. The electronic device of claim 3, wherein the interposer board is smaller in area than the printed circuit board by a threshold amount.

5. The electronic device of claim 1, wherein the two-dimensional backlight comprises a connector configured to supply the brightness data and power to the respective driver circuitry.

6. The electronic device of claim 1, wherein the two-dimensional backlight comprises a connector that is disposed centrally on the two-dimensional backlight.

7. The electronic device of claim 1, wherein the two-dimensional backlight comprises a connector, and wherein the connector and the respective driver circuitry are disposed along two adjacent columns of tiles of the at least two columns of tiles.

8. The electronic device of claim 1, wherein the two-dimensional backlight comprises a connector configured to provide the brightness data and power using rib-cage routing or H-routing.

9. The electronic device of claim 1, wherein the two-dimensional backlight comprises a connector, and wherein an equal number of driver circuitry is disposed on either side of the connector.

10. A backlight of an electronic display, comprising:

at least two columns of tiles and at least two rows of tiles, wherein each tile of the at least two columns of tiles and the at least two rows of tiles comprises a plurality of backlight elements; and respective driver circuitry associated with respective tiles of the at least two columns of tiles and the at least two rows of tiles, wherein the respective driver circuitry comprises respective row driver circuitry and respective column driver circuitry, and wherein the respective driver circuitry is configured to receive brightness data corresponding to the plurality of backlight elements and drive respective backlight elements associated with each of the respective tiles of the at least two columns of tiles and the at least two rows of tiles via the respective row driver circuitry at a first time interval and the respective column driver circuitry at a second time interval, wherein the first time interval and the second time interval are different.

11. The backlight of claim 10, comprising a backlight timing controller configured to supply one or more timing signals to the respective driver circuitry and control the respective tiles of the at least two columns of tiles and the at least two rows of tiles via the respective driver circuitry.

12. The backlight of claim 10, comprising a first backlight timing controller configured to control a first set of the at least two columns of tiles and the at least two rows of tiles and a second backlight timing controller configured to control a second set of the at least two columns of tiles and the at least two rows of tiles.

13. The backlight of claim 10, comprising one or more connectors configured to supply the brightness data and power to one or more backlight timing controllers.

14. The backlight of claim 10, wherein the respective driver circuitry associated with each tile of the at least two columns of tiles and the at least two rows of tiles and a connector are disposed along a spine of the backlight.

15. The backlight of claim 10, comprising a connector disposed along a spine of the backlight, wherein the respective driver circuitry associated with each tile of the at least two columns of tiles and the at least two rows of tiles is disposed centrally on each tile of the at least two columns of tiles and the at least two rows of tiles.

16. The backlight of claim 10, comprising a connector disposed along a spine of the backlight, wherein the respective driver circuitry associated with each tile of the at least two columns of tiles and the at least two rows of tiles is disposed closer to other respective driver circuitry associated with another tile of the at least two columns of tiles and the at least two rows of tiles than a central location of that tile.

17. A method, comprising:

receiving brightness data corresponding to a plurality of backlight elements of a first tile of at least two columns of tiles and at least two rows of tiles of a backlight;

distributing the brightness data to first tile driver circuitry associated with the first tile of the at least two columns of tiles and at least two rows of tiles, wherein the first tile driver circuitry comprises respective first row driver circuitry and respective first column driver circuitry, and wherein each tile of the at least two columns of tiles and the at least two rows of tiles is associated with respective tile driver circuitry; and driving the plurality of backlight elements of the first tile driver circuitry to emit light from the backlight to illuminate a display panel of an electronic display via the respective first row driver circuitry at a first time interval and the respective first column driver circuitry at a second time interval, wherein the first time interval and the second time interval are different.

18. The method of claim 17, comprising supplying the brightness data and power to the first tile driver circuitry using a connector of the backlight disposed on an opposite side of a printed circuit board from the first tile.

* * * * *